(12) United States Patent
Giampavolo et al.

(10) Patent No.: US 11,244,549 B2
(45) Date of Patent: Feb. 8, 2022

(54) INFORMATION DISPLAY DEVICE AND TECHNIQUE

(71) Applicant: Safe-Strap Company, LLC, Fort Meyers, FL (US)

(72) Inventors: Paul Giampavolo, Fort Meyers, FL (US); Christopher M. Johnson, Glen Allen, VA (US)

(73) Assignee: Safe-Strap Company, LLC, Fort Myers, FL (US)

( * ) Notice: Subject to any disclaimer, the term of this patent is extended or adjusted under 35 U.S.C. 154(b) by 0 days.

(21) Appl. No.: 16/812,722

(22) Filed: Mar. 9, 2020

(65) Prior Publication Data

US 2020/0286348 A1    Sep. 10, 2020

Related U.S. Application Data

(60) Provisional application No. 62/815,048, filed on Mar. 7, 2019.

(51) Int. Cl.
*G08B 13/24* (2006.01)
*G06K 19/06* (2006.01)
*G06K 19/077* (2006.01)
*G06K 7/14* (2006.01)

(52) U.S. Cl.
CPC ....... *G08B 13/2434* (2013.01); *G06K 7/1417* (2013.01); *G06K 19/06028* (2013.01); *G06K 19/06037* (2013.01); *G06K 19/07758* (2013.01)

(58) Field of Classification Search
CPC ............ G08B 13/2434; G06K 7/1417; G06K 19/06028; G06K 19/07758; G06K 19/06037
USPC ....................................... 340/572.8
See application file for complete search history.

(56) References Cited

U.S. PATENT DOCUMENTS

| | | | | |
|---|---|---|---|---|
| 3,281,978 A * | 11/1966 | Drugan | ................... | G09F 23/06 |
| | | | | 40/308 |
| 7,217,031 B2 * | 5/2007 | Bhavnani | ........... | G04B 37/1413 |
| | | | | 24/3.12 |
| 8,905,305 B2 * | 12/2014 | Crum | ..................... | G06Q 30/06 |
| | | | | 235/383 |
| 9,126,616 B2 * | 9/2015 | Crum | ........................ | B26B 5/00 |
| 9,637,152 B2 * | 5/2017 | Dyer | ..................... | B62B 3/1468 |
| 2003/0221283 A1 * | 12/2003 | Myers | ..................... | G09F 21/04 |
| | | | | 16/110.1 |
| 2013/0313297 A1 * | 11/2013 | Belby | ................... | B62B 3/1428 |
| | | | | 224/411 |
| 2018/0357981 A1 * | 12/2018 | Ng | ......................... | G09G 5/12 |

* cited by examiner

*Primary Examiner* — John A Tweel, Jr.
(74) *Attorney, Agent, or Firm* — West Hill Technology Counsel

(57) ABSTRACT

Discussed herein are techniques and implementations for deployment of machine-readable indicia on objects. The deployment can be achieved with a mechanical device to affix the machine-readable indicia to an object. The machine-readable indicia can be applied to the mechanical device, which then can be affixed to the object. The mechanical device can be portable and easily affixed to the object with snap-coupling fasteners. Structures on the mechanical device can help to locate and/or maintain the device on the object.

18 Claims, 4 Drawing Sheets

INFORMATION DISPLAY DEVICE AND TECHNIQUE

RELATED APPLICATIONS

This application claims the benefit of U.S. Provisional Patent No. 62/815,048, filed Mar. 7, 2019, entitled "Information Display Device and Technique" the contents of which are incorporated by reference herein in their entirety.

STATEMENT REGARDING FEDERALLY SPONSORED RESEARCH OR DEVELOPMENT (Not Applicable)

BACKGROUND

Machine readable information can be presented in a number of ways. For example, 1D and 2D barcodes, holograms, digital watermarking, data glyphs, cryptographs and QR (quick response) codes present information that can be read by a machine, such as a computing device. A QR code is a matrix barcode, or two-dimensional barcode, and can store information in a black and white grid. The QR code can be read by, for example, an imaging device such as a camera, digitized and interpreted using the horizontal and vertical components of the grid. One popular use for QR codes is to store information for a URL (uniform resource locator) that can be employed in a browser to take a user to a given website. A user captures an image of the QR code, which is interpreted by the imaging device, often a smart phone, and the website encoded in the URL of the QR code is presented to the user.

QR codes have enjoyed ubiquitous usage, in part because of their ease of deployment. For example, QR codes can be displayed on a display screen, and captured by a user. QR code labels have been attached to various devices, often with adhesive, to provide a way for a user to obtain information about a given device. These QR code labels are sometimes difficult to remove or change, although often inexpensive to deploy. QR codes on a display screen imply the use of an electronic display device that can be somewhat expensive, and is often stationed at a given location.

SUMMARY

Discussed herein are techniques and implementations for deployment of machine-readable indicia on objects. The deployment can be achieved with a mechanical device to affix the machine-readable indicia to an object. The machine-readable indicia can be applied to the mechanical device, which then can be affixed to the object.

In some examples, the machine-readable indicia is an appliqué onto the mechanical device. In other examples, the machine-readable indicia is molded into the mechanical device, such as by laying a label in the mold prior to introduction of the molding material to form the mechanical device. Alternately, or in addition, the mold can be constructed to form the machine-readable indicia. Any type of sufficient application may be used to locate the machine-readable indicia on the mechanical device. Multiple machine-readable indicia may be provided on the mechanical device. The multiple machine-readable indicia may be the same or different.

The mechanical device can be deployed as a housing, with mechanisms to affix the device to objects, including any type of fasteners or adhesives. In some examples, a fastener is used that is in the form of a snap coupling that permits the device to be clasped around an object. In such examples, the snap coupling may take the form of mushroom-type posts that can be inserted into openings sufficiently that the mushroom portion extends through the opening and expands, thereby fastening two portions of the device together. Any other similar types of fasteners can be used, including rivets, screws, nuts and bolts, and any other fasteners that permit two portions of the device to be joined together. Adhesive couplings may be used to join the two portions of the device together. In addition, or alternatively, adhesives may be used to affix the device to an object. Other types of fasteners may be used, including magnetic, hook and loop, stitching, lacing and so forth. The fasteners or adhesives may be configured to be releasable or non-releasable. Non-releasable means that the fasteners or adhesives are designed to fasten and not unfasten, or be damaged to be unfastened.

The mechanical device may be composed of any useful material, including metal, plastic, textile or other suitable materials. Plastics that may be used include polyethylene, impact resistant nylon and glass filled nylon. The mechanical device can be configured to be flexible or rigid. The material may be configured to be weather resistant, and may be provided in a number of colors. The mechanical device may be produced by molding.

In some examples, the mechanical device is configured as a hollow tube or ring. In some examples, the device has two fastener portions on either side of the device. In some examples, the device can have a hinge portion and a fastener portion, to permit the device to be opened and clasped around the object in a fastened state. A cross-sectional shape of the tube or ring can be circular, oval, triangular, square, rectangular, polygonal or any type of desired or suitable shape.

In some examples, the device is configured to be non-releasably fastened to the object. Some fasteners that can be used in this instance include rivets, non-releasable snap couplings, locking fasteners, stitching and the like. The fastening may be achieved by welding or other non-reversible techniques.

The device may include structural features that operate to maintain the device in place on the object. Examples of such features include resilient flanges, ribs or beads that make contact when the device is affixed to the object. The features may exert a force or compression on the object upon being affixed thereto to contribute to maintaining the device in place on the object. The features may be deformable to permit adaptation to the contours of the object. The features may include resilient structures or springs, which may be arranged internally or on lateral portions of the device, or at any useful location on the device. The features may allow the device to move on the object, such as by rotating or sliding, for example.

In some example applications, the device is attached to the handlebar of a shopping cart. The device may be designed with complementary structures that snap together. The complementary structures may be on two separate portions of the device, which portions are of the same size and shape. For example, the portions can come from the same mold and can complementarily engage with each other to be attached to the handlebar. In some implementations the device may include a hinge and a non-releasable snap closure. The device may be affixed to the handlebar by opening the device, e.g., pivoting about the hinge, placing the open device around the handlebar, and applying pressure to the snap closure to engage the snap mechanism. The device may be composed of polyethylene, and may have a QR code molded into one or more surfaces or facets of the exterior. A cross-section of the example device is hexagonal in shape, and a QR code is molded into each of six facets that form the hexagonal shape. Resilient flanges are provided at each end of the tube-shaped device that contact the handlebar to maintain the device in place. The device may slide along and/or rotate on the handlebar.

In some example applications, physical retail stores may entice shoppers to shop in their store while simultaneously gathering purchasing data concerning these shoppers. Through the use of the presently disclosed subject matter, such enticements to the shopper may be adequately targeted and tailored to a specific shopper who is present in its store. In addition, the store may collect a shopper's shopping pattern information for performing analytics or other purposes.

BRIEF DESCRIPTION OF THE SEVERAL VIEWS OF THE DRAWINGS

The subject matter is described in greater detail below, with reference to the accompanying drawings, in which.

DETAILED DESCRIPTION

Figure 1:
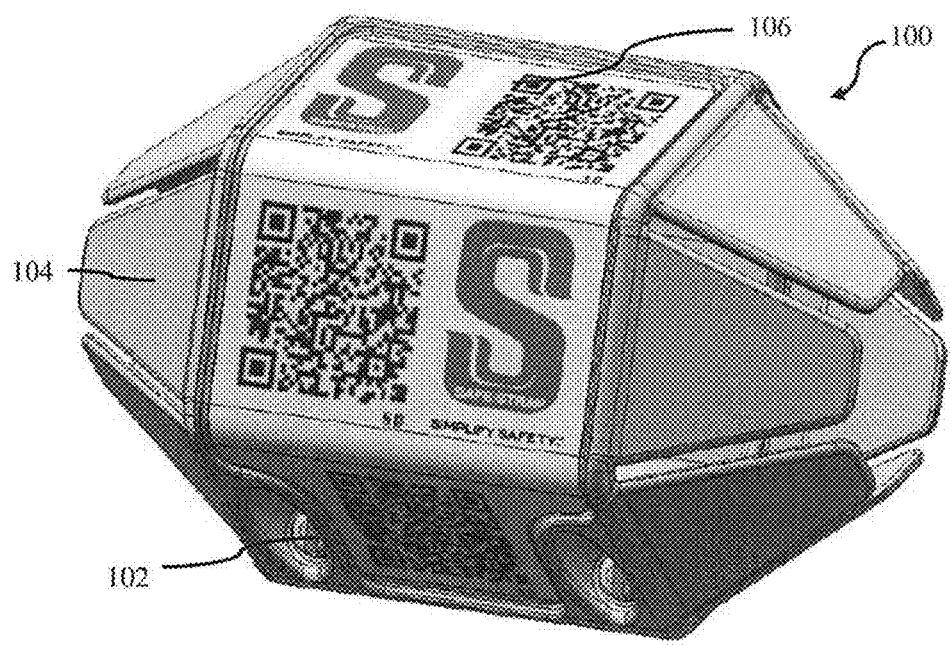
FIG. 1 is an isometric view of an example implementation according to the present disclosure, including machine-readable indicia and source information.
Figure 2:
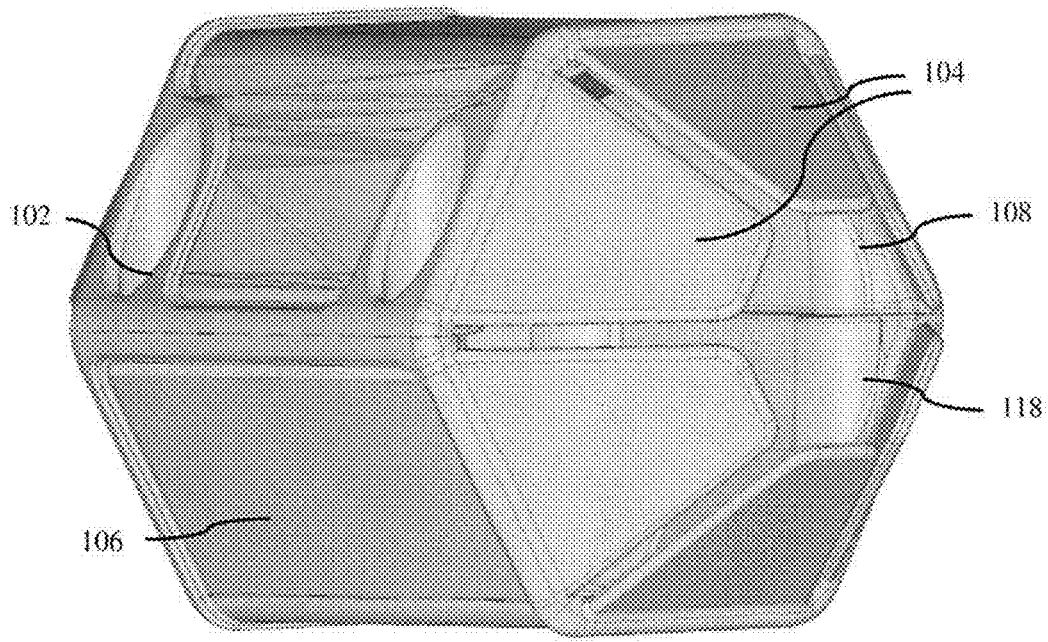
FIG. 2 is an isometric view according to an example implementation.
Figure 3:
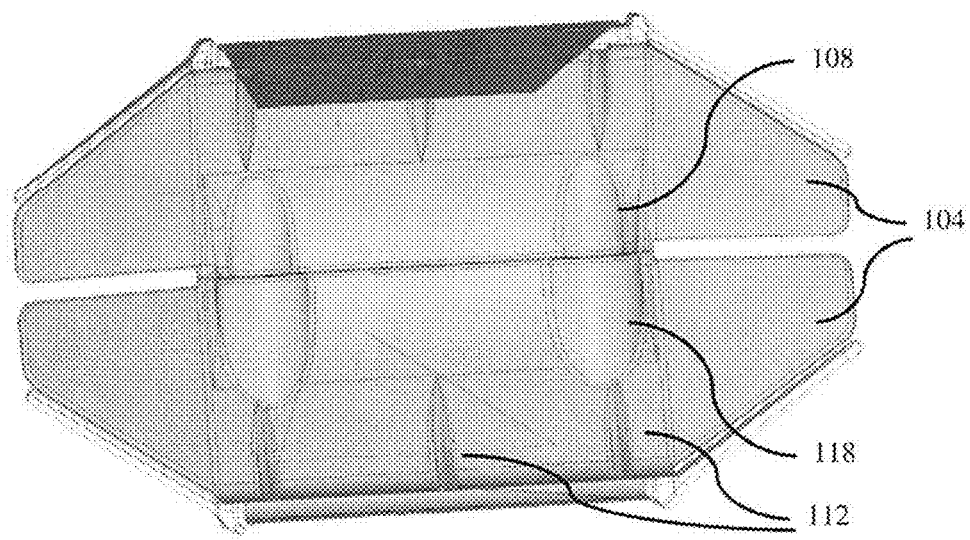
FIG. 3 is a cross-sectional view along a long axis according to an example implementation.
Figure 4:
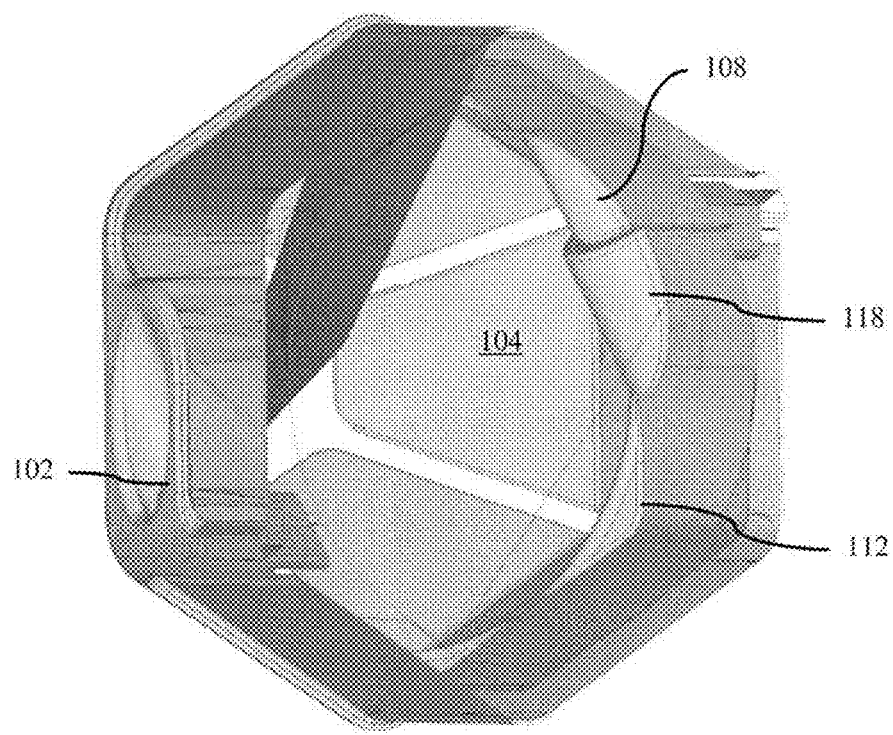
FIG. 4 is a cross-sectional view along a short axis according to an example implementation.
Figure 5:
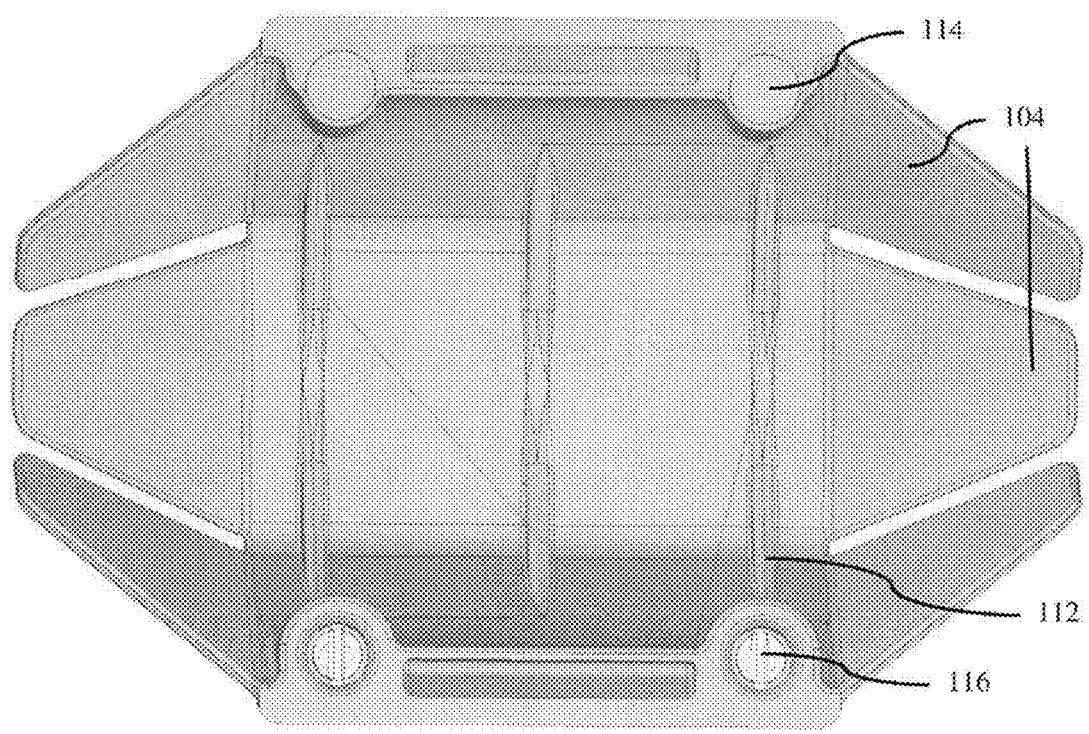
FIG. 5 is another cross-sectional view along a long axis according to an example implementation.
Figure 6:
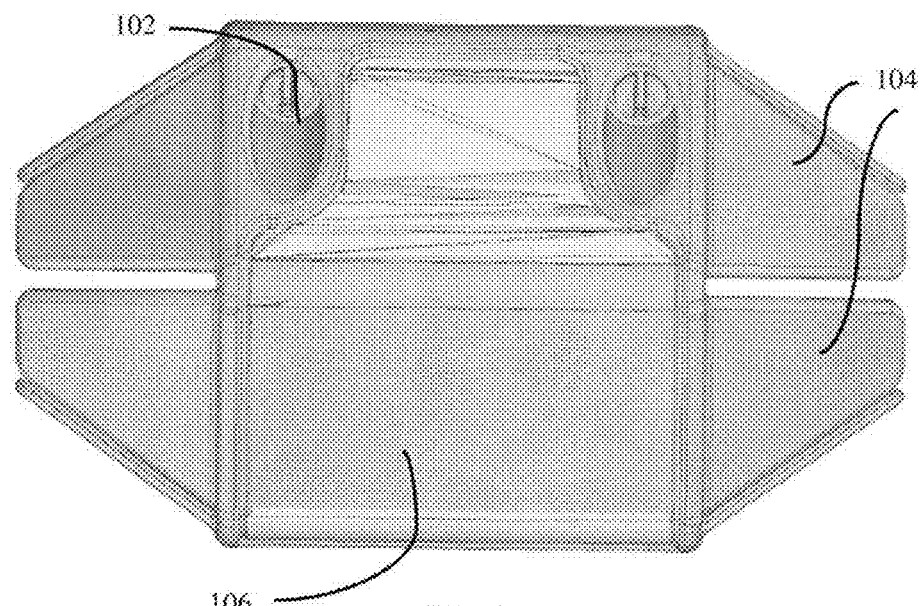
FIG. 6 is a side plan view according to an example implementation.

Referring to FIGS. 1-6, an example implementation of a machine-readable indicia presentation device is illustrated. FIG. 1 is an isometric view of an example implementation of a device 100 according to the present disclosure, including machine-readable indicia and source information. In the example of FIG. 1, the machine-readable indicia is a QR code, however, any type of machine-readable indicia may be used. The machine-readable indicia is provided on a facet 106 of the device. In this example implementation, device 100 includes six such facets 106, however, any number of facets, including zero (e.g. an annular surface) can be provided.

In some examples, the machine-readable indicia is an appliqué onto the facet 106. In some examples, a clear plastic cover (not shown) is applied over the facets 106 to prevent the removal of any machine-readable indicia. In other examples, the machine-readable indicia is molded into the facets 106, such as by laying a label in the mold prior to introduction of the molding material to form the facets 106. Alternately, or in addition, the mold can be constructed to form the machine-readable indicia. In some example embodiments, the facets 106 could have interchangeable panels (not shown) where machine-readable indicia could be temporarily inserted in slots in the panels and easily removed to insert one or more alternative machine-readable indicia in the slots.

Resilient flanges 104 are provided on ends of device 100. Flanges 104 can contact an object to which device 100 is attached or affixed and flex outwardly to impart a force to the object, which can contribute to maintaining device 100 in place. Flanges 104 can contact the object to which device 100 is attached to resist movement of device 100 on the object. In some implementations, flanges 104 contribute to locating device 100 on the object. In addition, or alternatively, flanges 104 help to locate device 100 on the object, while permitting device 100 to slide or rotate on the object. Flanges 104 can be adapted in size and/or shape to be a complementary to a structure on the object, so that attaching device 100 to the object forms an engagement that positions and maintains device 100 at a given location on the object Device 100 includes recesses or anchor sleeves 102, which can form part of a fastener that serves to join portions of device 100 together. Device 100 can be fastened together using any type of fasteners or connectors, including adhesives. In the illustrated example, sections of device 100 are joined together with a post and opening-type clasp. A post 108 includes a mushroom-type tip 116 that compresses upon insertion into an opening 114 defined by channel 118. Upon full insertion into opening 114, mushroom tip 116 of post 108 expands and engages an edge of opening 114 in recess or anchor sleeve 102, which serves to fasten the portions of device 100 together. Any other type of fastener, clasp or latch mechanism may be used to join the portions of device 100 together. In one implementation (not shown), device 100 includes a hinge, which can be deployed as a flexible seam along an edge of device 100. The hinge mechanism, which may be deployed as a live hinge, an integral hinge, or other similarly functional hinge mechanism, permits device 100 to be folded about an object and secured to itself to attach device 100 to the object. In another example implementation (not shown), device 100 is molded flat with a hinge, and printed with machine-readable indicia.

Reinforcing ribs 112 contribute to providing structural support to device 100. Ribs 112 can be resilient, flexible and/or compressible, to contribute to maintaining device 100 in contact with, or enclosed about an object. For example, ribs 112 can be compressible when urged against the object to contribute to stabilizing device 100 on the object. Various substitutions or additions can be made for ribs 112, such as by using adhesives, for example.

Flanges 104 can be modified or enhanced with various substitutions or additions as well. For example, flanges 104 can be implemented as interior leaf springs, coil springs or other types of resilient mechanisms. Flanges 104 can include adhesives on inner edges, or other compressive or high friction components, such as pressure adhesives, alone or in combination with foam rubber pads, for example.

The presently disclosed subject matter enables a shopper to utilize a mobile electronic device, such as a smart phone, to enhance their shopping experience. It also enables a physical retail store to entice shoppers to shop in their store while simultaneously gathering purchasing data concerning these shoppers.

Figure 7:
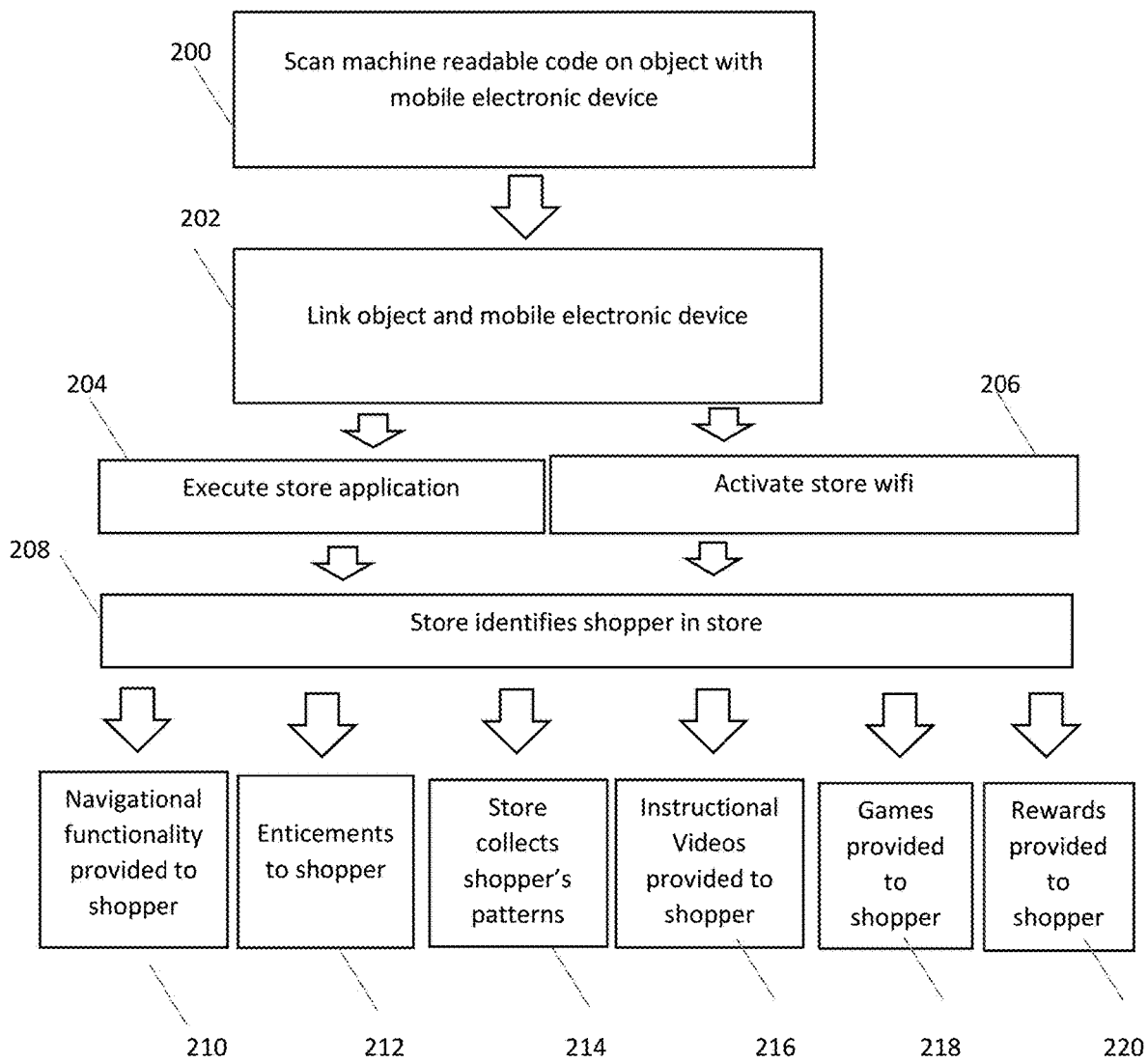
FIG. 7 is a flow diagram of a system according to an example implementation.

Referring to FIG. 7, in some example applications, at block 200, a shopper utilizing a shopping cart with the present invention may use their smart phone to scan the QR code, or other machine readable code, located on the presently disclosed subject matter. As shown in block 202, once the QR code is scanned by the shopper's smart phone, the QR code and smart phone are linked. In some example applications, the QR codes may be categorized with generic headings, as provided by the physical retail stores, such as COUPONS, REWARDS, GAMES, INFORMATION, SPE- CIALS, VALUED CUSTOMER, or a similar type of category of heading. In some example applications, at block 204, the shopper's mobile device may execute a physical retail store application that permits the mobile device to communicate with the store Wi-Fi network, at block 206, and to pair with the QR code on the present invention. In some example applications, as shown in block 208, electronically receiving data from the shopper's smart phone uniquely identifies a shopper and the presence of the shopper within the physical retail store, thereby enabling the store to provide enticements to the shopper adequately targeted and tailored to the specific shopper, as shown in block 212. This also permits the location of the mobile device to be known using location detection techniques and may provide the shopper with optional navigational functionality, as shown in block 210. In addition, the store may collect a shopper's shopping pattern information for performing analytics or other purposes, as shown in block 214. One of ordinary skill in the art will recognize and appreciate that in some example applications the content that the QR code is linked to is not stored in the QR code, thereby enabling the QR code to remain consistent while the content that the QR code links to may be independently modified.

In some example applications, such enticements to the shopper may include pecuniary rewards targeted directly to the shopper's needs, as shown in block 220. Additionally, the shopper may be provided with instructional videos, recipes, gaming applications for both adults and children, or other information via its smart phone, as shown in blocks 216 and 218. In some example embodiments, a gaming application may permit a shopper to search for items of interest in the store as an objective of the game, wherein a navigation feature guides the shopper to promoted items during the playing of the game.

In some example applications, the scanning of the QR code with a mobile electronic scanning device may also be utilized to register a rewards tracker, use with other applications for promotional offerings, create a digital shopping list, or to provide additional content downloads.

For example, the machine readable information may be scanned by a smartphone and used to identify an application available for the shopper to download. The shopper may download the application, and the machine readable information may be used to obtain information related to the shopper. For example, information may be obtained about the shopper's location, products or services of interest to the shopper, frequency of shopping at a given store or for a given product or service, and any other type of information that might be useful for a retailer or shopper. The information may be tracked or stored by the application. The retailer may provide offers to the shopper that are related to the shopper's preference or desires determined from the information. For example, a shopper that purchases goods or services related to children in a certain age range may be offered other items that may appeal to children of that age range.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

What is claimed is:

1. A device for attaching machine-readable indicia to an object, comprising:
   a tube-shaped housing with a surface for supporting the machine-readable indicia; and
   a clasping mechanism on the housing, the clasping mechanism comprising a first end and a second end, and a first resilient flange portion on the first end and a second resilient flange portion on the second end, the first and second resilient flange portions slanted toward the object and adapted for securing the housing to the object to permit rotation of the housing on the object.

2. The device of claim 1, wherein the housing further comprising one or more facet portions, the facet portions supporting the machine-readable indicia.

3. The device of claim 2, wherein the first and second flange portions adapted to flex outwardly to maintain the device on the object.

4. The device of claim 3, wherein the first and second flange portions maintain the device in a fixed location on the object.

5. The device of claim 3, wherein the first and second flange portions are adapted to permit the location of the device to be adjustable on the object.

6. The device of claim 1, wherein the clasping mechanism comprising a post including a tip, and a channel defining an opening for receiving the post.

7. The device of claim 6, wherein the clasping mechanism further comprising an anchor sleeve to receive the tip of the post upon insertion into the opening.

8. The device of claim 1, wherein the housing further comprising reinforcing ribs for stabilizing support of the housing to the object.

9. The device of claim 1, wherein the machine-readable indicia comprising a QR code.

10. The device of claim 1, wherein the machine-readable indicia is scanned by an imaging device to identify the presence of a user of the imaging device in the location of the object.

11. The device of claim 10, wherein upon scanning the machine-readable indicia the imaging device provides user related information.

12. The device of claim 11, wherein the user related information includes a pecuniary reward tailored to the user.

13. The device of claim 11, wherein the user related information includes a gaming application.

14. The device of claim 11, wherein the user related information includes an instructional video.

15. The device of claim 11, wherein the user related information links to a database in the location of the object, thereby providing the user with nearby related information.

16. A method for attaching machine-readable indicia to an object, comprising:
   locating the machine-readable indicia on a surface of a tube-shaped housing; and
   affixing a clasping mechanism of the housing to the object, wherein the clasping mechanism includes a first resilient flange portion on a first end and a second resilient flange portion on a second end, the first resilient flange portion and second resilient flange portion slanted toward the object and adapted for securing the housing on the object to permit rotation of the housing on the object.

17. The method of claim 16, wherein the method further comprising scanning the machine-readable indicia by an imaging device to identify the presence of a user of the imaging device in the location of the object.

18. The method of claim 17, wherein the scanning of the machine-readable indicia provides user related information.

* * * * *